United States Patent
Looije et al.

[11] Patent Number: 6,132,201
[45] Date of Patent: Oct. 17, 2000

[54] FRAMELESS ELECTRIC DRIVE FOR A MOLDING MACHINE

[75] Inventors: Peter Looije, Newmarket; Ronald Ing, Etobicoke; William Jacovich, Newmarket, all of Canada

[73] Assignee: Husky Injection Molding Systems Ltd., Canada

[21] Appl. No.: 09/165,448

[22] Filed: Oct. 2, 1998

Related U.S. Application Data

[63] Continuation-in-part of application No. 09/072,310, May 4, 1998.

[51] Int. Cl.[7] .................................................. B29C 45/68
[52] U.S. Cl. ........................................... 425/589; 425/595
[58] Field of Search ....................................... 425/589, 595

[56] References Cited

U.S. PATENT DOCUMENTS

| | | |
|---|---|---|
| 4,797,086 | 1/1989 | Adachi . |
| 4,828,475 | 5/1989 | Kamiguchi . |
| 4,895,505 | 1/1990 | Inaba et al. . |
| 4,988,273 | 1/1991 | Faig et al. . |
| 5,052,909 | 10/1991 | Hertzer et al. . |
| 5,338,174 | 8/1994 | Miese et al. . |
| 5,513,977 | 5/1996 | Kitajima . |
| 5,531,580 | 7/1996 | Bonino et al. . |
| 5,565,224 | 10/1996 | Stillhard . |
| 5,585,126 | 12/1996 | Heindl et al. . |
| 5,728,409 | 3/1998 | Schad et al. . |

*Primary Examiner*—Tim Heitbrink
*Attorney, Agent, or Firm*—Bachman & LaPointe, P.C.

[57] ABSTRACT

The present invention relates to an improved drive system for rotatable members in molding machines. The drive system comprises at least one frameless, brushless electric motor having a stator mounted to the machine and a rotor directly coupled to the rotatable member. Each rotor is coupled to the rotatable member so that the axis of rotation of the rotor is concentric to the axis of rotation of the rotatable member.

7 Claims, 8 Drawing Sheets

FRAMELESS ELECTRIC DRIVE FOR A MOLDING MACHINE

CROSS REFERENCE TO RELATED APPLICATION(S)

This application is a continuation-in-part of U.S. Ser. No. 09/072,310, filed May 4, 1998, entitled FRAMELESS ELECTRIC DRIVE FOR TURRET MACHINE, to Peter Looije et al.

BACKGROUND OF THE INVENTION

The present invention relates to an injection molding machine having an improved system for driving a rotatable member such as a turret, a turntable, or a rotary stutter element for a clamping piston.

Over the years, a number of different systems have been developed to drive rotatable components in an injection molding machine. For example, it is known to use belt driven systems to drive a rotatable turntable mounted on the moving platen of a horizontal injection molding machine. It also is known to use a belt driven system for driving a turntable mounted on a vertical injection molding machine. This latter type of drive system is illustrated in co-pending U.S. Pat. application Ser. No. 08/140,424, entitled Vertical Injection Molding Machine, to Elward et al., which is assigned to the assignee of the instant application.

Electric motors are well known in the art and also have been used to drive a number of different components in an injection molding machine. For example, it is known to use an electric motor and gearbox arrangement to rotate mold segments in an injection blow molding machine. Such a system is illustrated in U.S. Pat. No. 5,531,580 to Bonino et al. It is also known in the prior art to use an electric motor to drive via a gearbox or belt the turret block of an injection molding machine to cause rotation of same. Such a system is illustrated in U.S. Pat. No. 5,728,409, entitled Turret Article Molding Machine, to Schad et al., which patent is assigned to the assignee of the instant application.

The principal disadvantage of these systems however is that the drive train, belt or gears, cause inaccuracies in the positioning of the member being driven after rotation. Accurate positioning of a turret for example is required so that mold segments are aligned to allow closing without damage or wear. This disadvantage originates in drive transmission systems which have a degree of elasticity in the transmission of motion. This is due either to clearances in the mechanism (gears) or elasticity in the belt. This lack of close-coupling also reduces the speed of response of the drive since inertial forces are absorbed by the elasticity of the transmission. Quickly stopping or starting such a drive does not cause the turret block to move in complete synchronization. This can be detrimental when optimizing cycle time of the machine.

Electric motors have also been used to drive other components in injection molding machines. For example, electric drives for clamp actuation via intermediate transmissions are shown in U.S. Pat. Nos. 5,585,126 to Heindl et al.; 5,565,224 to Stillhard; 5,513,977 to Kitajima; 5,338,174 to Miese et al.; 4,828,475 to Kamiguchi; and 4,797,086 to Adachi. An electric motor drive for linearly moving an injection screw is shown in U.S. Pat. No. 4,895,505 to Inaba et al. In the Inaba et al. system, a separate screw rotating motor is provided to rotate a shaft connected to the injection screw.

U.S. Pat. No. 5,052,909 to Hertzer et al. illustrates an injection molding machine having a pump driven by a variable speed motor preferably of the brushless DC type. U.S. Patent No. 4,988,273 to Faig et al. illustrates still another injection molding machine having brushless DC motors for driving the clamping unit, the injection unit, the extruder screw, and the ejector unit.

There remains a need however for a more efficient drive system which does not suffer from the disadvantages of the aforementioned systems.

SUMMARY OF THE INVENTION

It is a principal object of the present invention to provide a drive system for rotatable components in a molding machine, which drive system is relative stiff and allows faster response and more accurate positioning.

It is a further object of the present invention. to provide a drive system as above which allows for a more space efficient construction.

The foregoing objects are attained by the drive system of the present invention.

In accordance with the present invention, a molding machine is provided which has a rotatable member that is rotated about a rotation axis. A drive means is directly coupled to the rotatable member to effect the rotation about the rotation axis. The drive means preferably comprises at least one frameless, brushless electric motor having a stator and rotor. The rotor has an axis of rotation concentric with the rotation axis of the rotatable member and is directly coupled to the rotatable member.

The drive means of the present invention may be used to drive a turret for carrying molded parts and for transporting the molded parts to another portion of the machine. The drive means may also be used to drive other components in a molding machine such as a turntable mounted to a moving platen or a rotary shutter element associated with a clamping system.

Other details of injection molding machine(s) incorporating the drive system of the present invention, as well as other objects and advantages attendant thereto, are set forth in the following description and the accompanying drawings in which like reference numerals depict like elements.

DETAILED DESCRIPTION OF THE PREFERRED EMBODIMENT(S)

Figure 1:
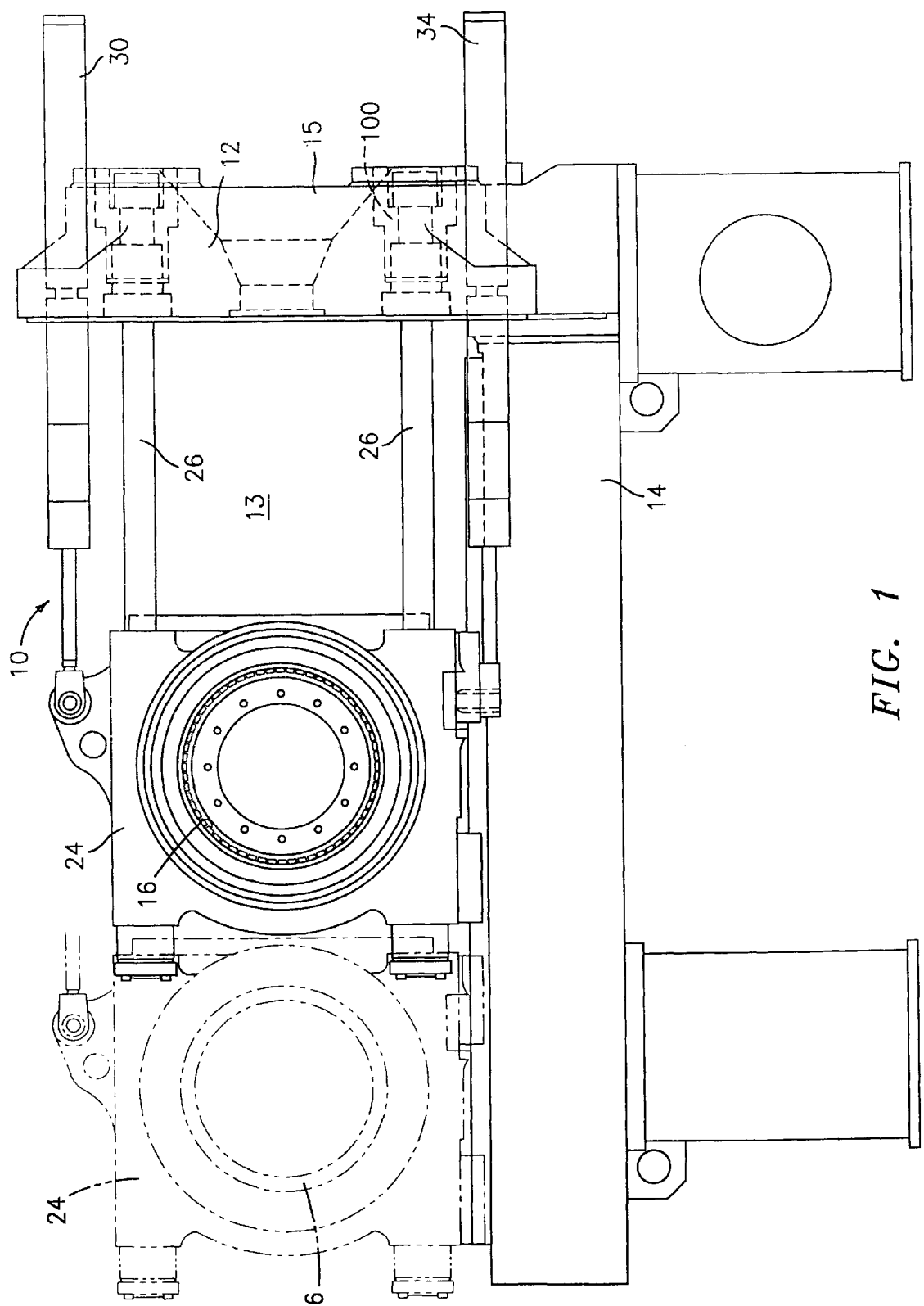
FIG. 1 is a side view of an injection molding machine clamp portion having a turret block.
Figure 2:
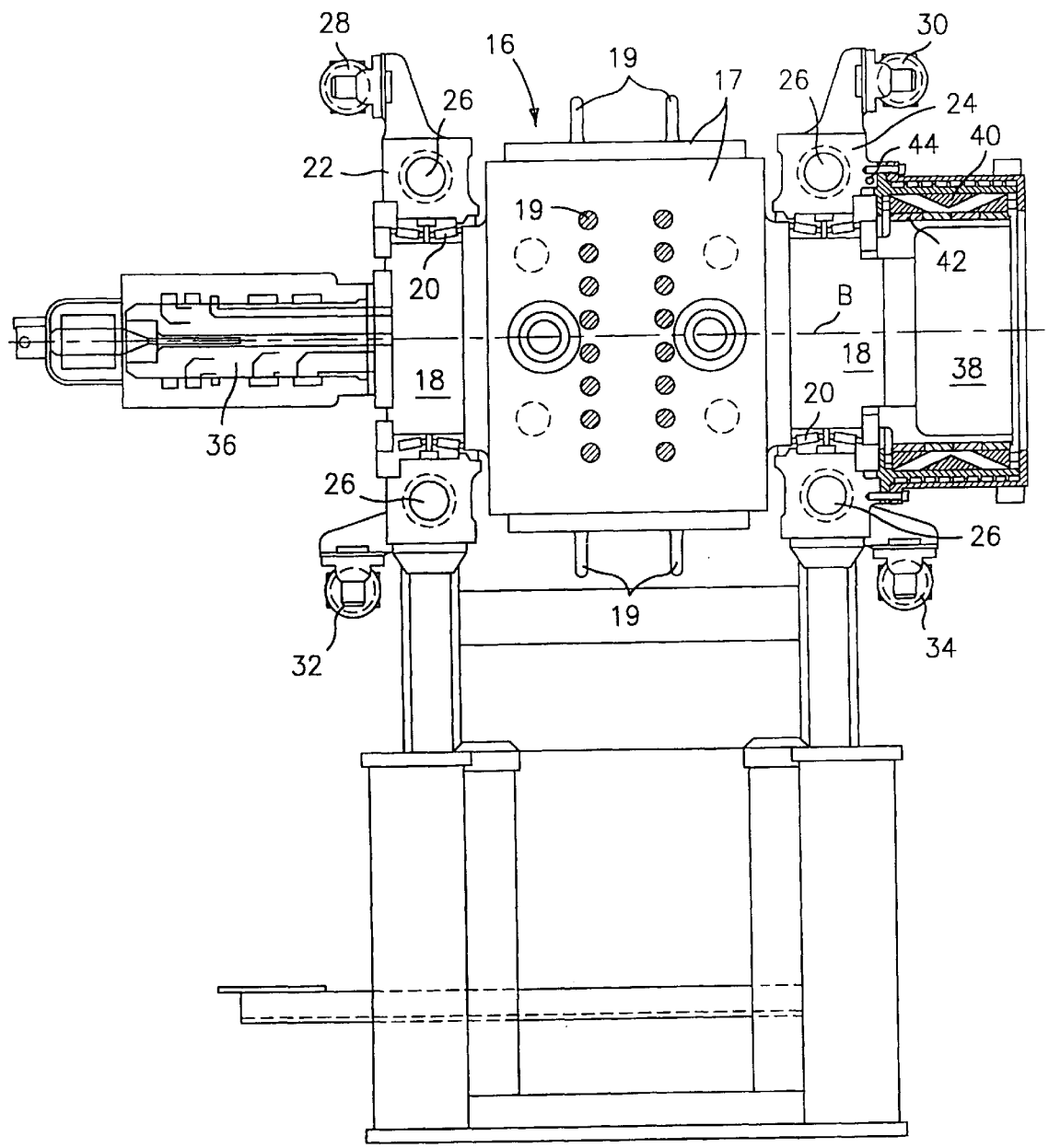
FIG. 2 is a front view of the turret block in the machine of FIG. 1 in partial section.

Referring now to the drawings, FIGS. 1 and 2 illustrate a clamp portion of an injection molding machine 10. As can be seen in these figures, the machine 10 includes a stationary platen 12 fixed to a clamp base 14. The stationary platen 12 has a mold half 13 containing a plurality of mold cavities (not shown). Molten material to be formed into an article is fed into the mold cavities by an injection unit (not shown) which mates with the opening 15.

The machine 10 includes a rotary turret block 16 which has a plurality of mold halves 17 mounted to its faces. Each of the mold halves 17 has a plurality of mold cores 19 for mating with the mold cavities in the mold half 13. The number of cores 19 in each mold half 17 corresponds to the number of cavities in the mold half 13. By providing the rotary turret block 16, molded articles which had been formed during a previous mold cycle may be cooled while new articles are formed during a subsequent mold cycle. The turret block 16 is designed to rotate about an axis B and to this end is mounted on a plurality of trunnions 18 running in bearings 20 mounted in carriers 22 and 24.

During the molding cycle, the turret block 16 is moved towards and away from the stationary platen 12. To accomplish this, the carriers 22 and 24, in which the turret block 16 is mounted, are moved towards and away from the stationary platen 12, along the base 14, by cylinders 28, 30, 32 and 34. The tiebars 26 engage corresponding locking/clamping pistons 100 mounted in the stationary platen 12.

Typically, services such as coolant air, electric power and the like must be provided to the turret block 16. To this end, a rotary manifold 36 is provided and connected to one of the trunnions 18 via bolts or other suitable connecting means.

Figure 8:
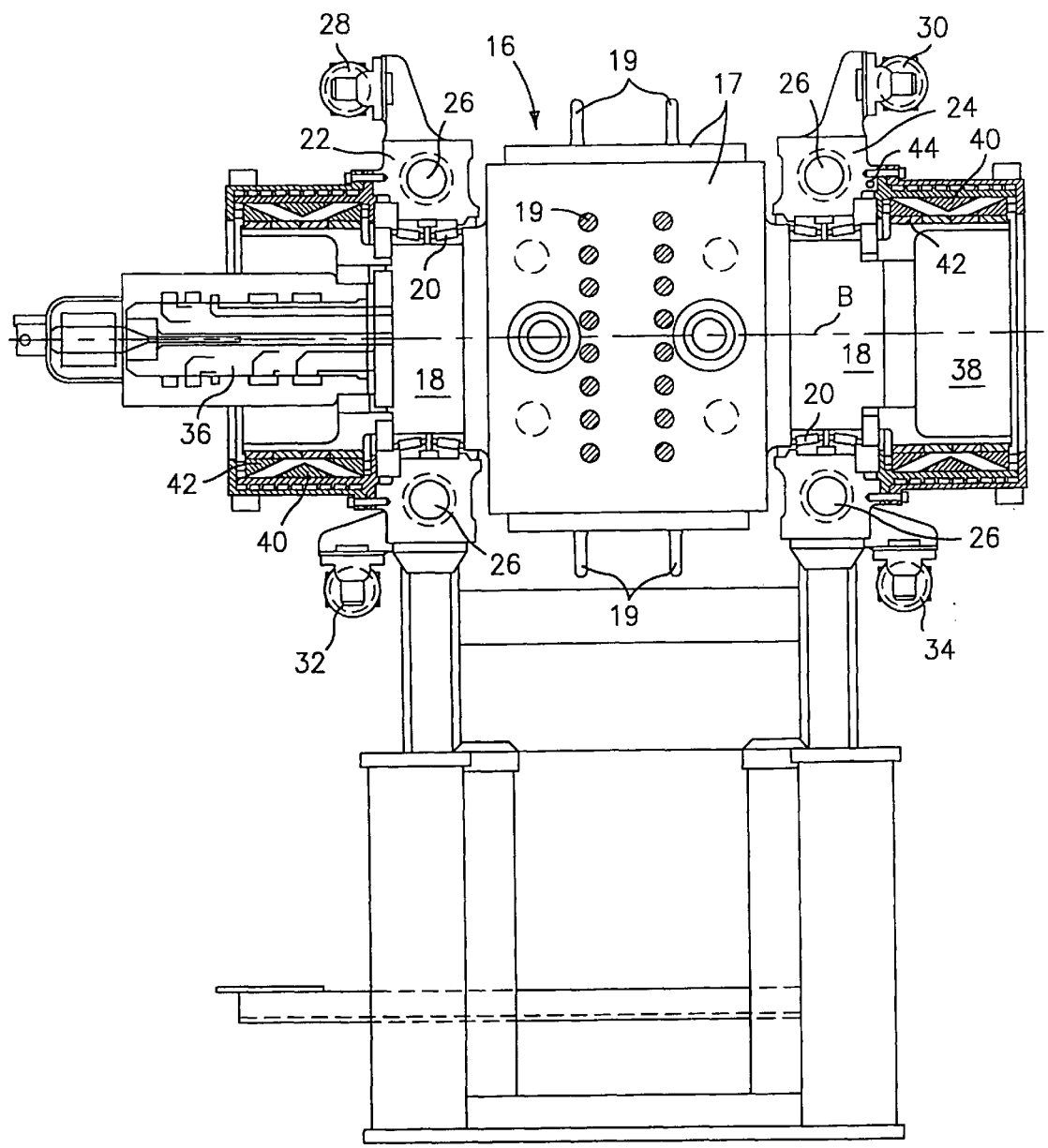
FIG. 8 is a front view in partial section of a turret block driven by two motors.

The turret block 16 is rotated about the rotation axis B by a drive system which preferably comprises at least one frameless, brushless electric motor 38. As can be seen in FIG. 2, the motor 38 includes a stator 40 having a plurality of coils mounted to the carrier 24 and a rotor 42 which rotates about an axis concentric with the axis B. In accordance with the present invention, the rotor 42 is directly coupled to the turret trunnion 18, and thereby the turret block 16 by one or more bolts or other suitable connecting means, so that direct transmission of rotation is effected. As used herein, the term "directly coupled" means that there are no transmissions, belts, gears, gearboxes or the like between the rotor 42 and the turret block 16. If desired, two motors 38 may be connected to the turret block 16. As shown in FIG. 8, where two motors 38 are used, the rotor 42 of each is directly coupled to a respective one of the trunnions 18.

One type of motor which may be used for the motor 38 is a Kollmorgen RBE brushless, frameless motor.

If desired, one or more cooling circuits 44 may be added to the carrier 24 to dissipate heat that is generated by the coils of the stator 40. The cooling circuits may comprise cooling channels within the carrier 24 for carrying a cooling fluid such as a cooling gas or water.

In operation, the turret block 16 is moved toward the stationary platen 12 until one set of the mold cores 19 mates with the mold cavities in the mold half 13. The mold halves 13 and 17 are then clamped into a mold closed position. Molten material is injected into the cavity spaces defined by the mold cores and the mold cavities to form a plurality of molded articles, such as a preform. After completion of the injection cycle, the mold is opened by moving the turret block 16 away from the stationary platen 12. The turret 16 is then rotated 90 degrees by the operation of the motor(s) 38 to align a new set of mold cores with the mold cavities. The molding cycle is then repeated. When the mold cores carrying the molded articles reach a desired position such as a bottommost position, the molded articles are removed by ejection devices (not shown), which ejection devices may comprise any suitable ejection devices known in the art.

The drive system of the present invention provides a number of distinct advantages. For example, it is compact. The motor(s) 38 may be built-in and do not have to be mounted externally, which takes up space. Further, the transmission of the rotary force needed to rotate the turret 16 is direct. As a result, a stiffer coupling can be effected. This, in turn, makes the system faster to respond and more accurate in positioning.

While the turret block 16 has been described as, having four faces on which mold halves are mounted, it should be recognized that the block could have any number of faces. For example, if desired the block may have two or three faces.

Figure 3:
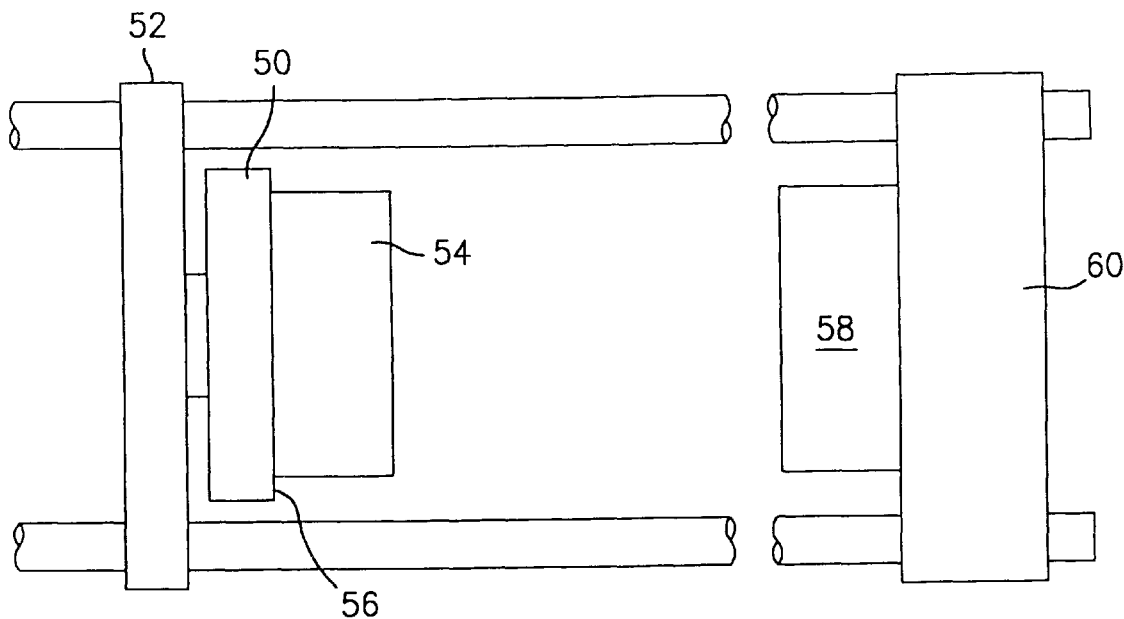
FIG. 3 is a side view of a horizontal injection molding machine clamp portion having a moving platen and a turntable mounted thereto.
Figure 4:
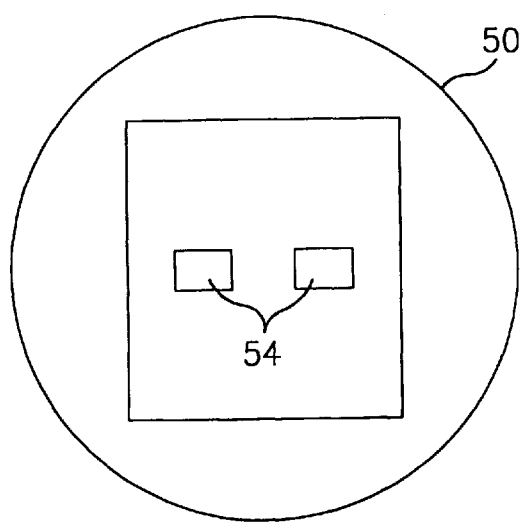
FIG. 4 is a front view of the turntable showing the mold half mounted thereto.
Figure 5:
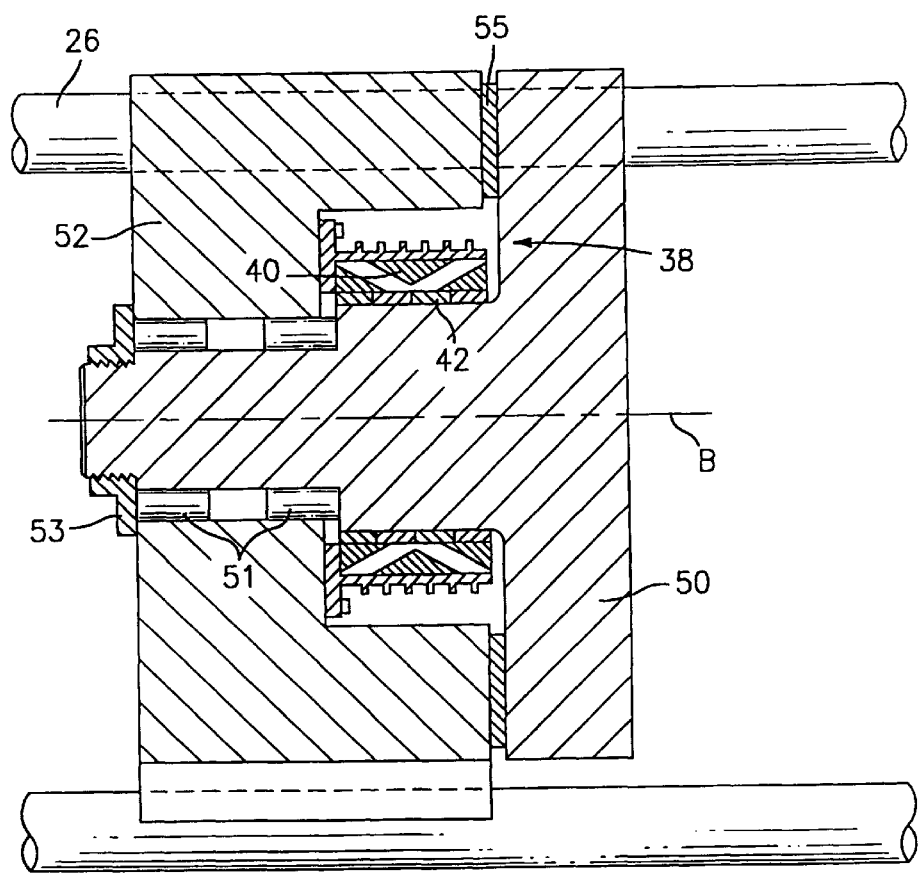
FIG. 5 is a sectional view showing the drive system of the present invention coupled to the turntable.
Figure 6:
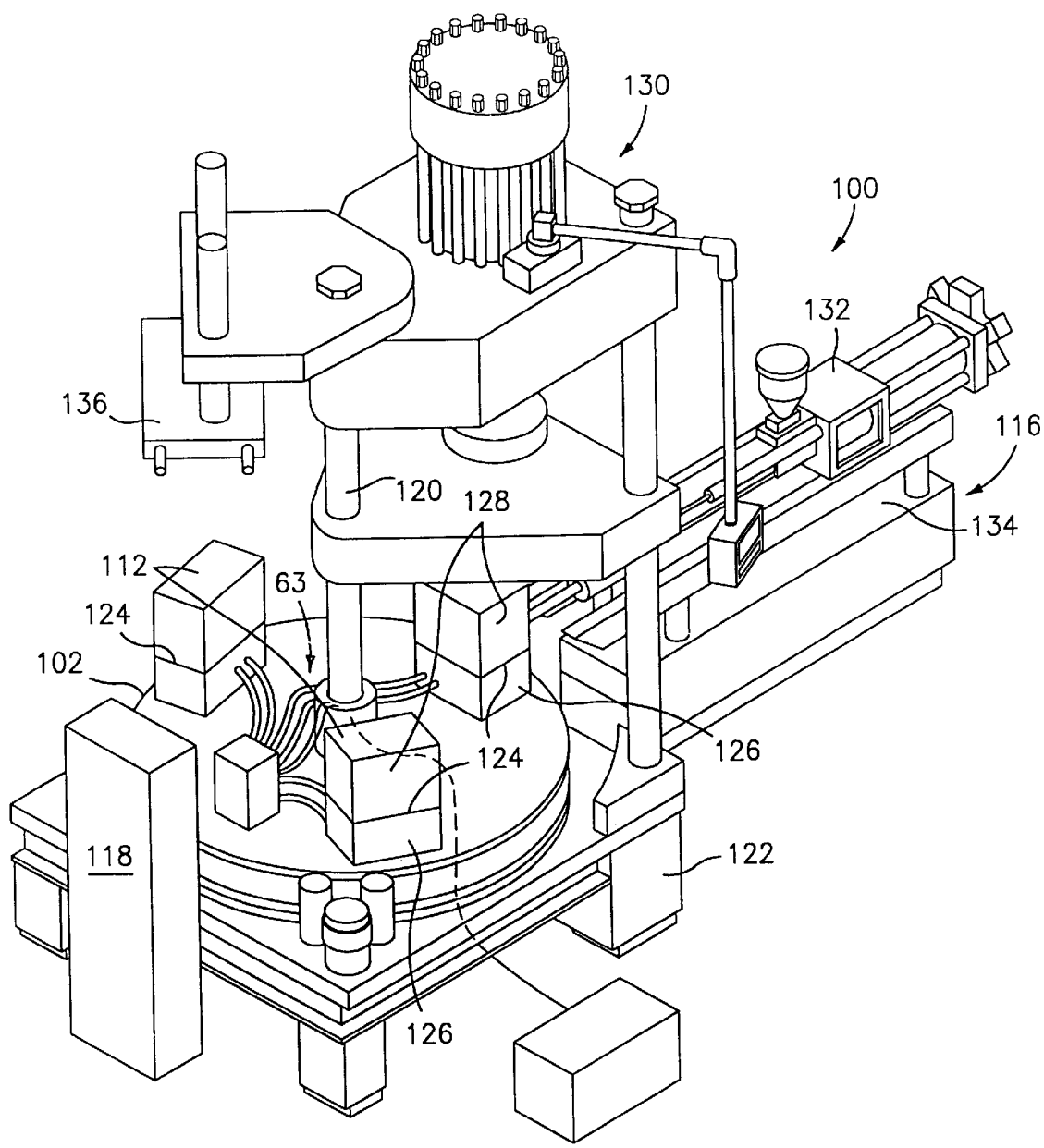
FIG. 6 is a perspective view of a vertical injection molding machine having a turntable for moving molds between various stations.

The drive system of the present invention has other applications besides driving a turret block in an injection molding machine. For example, as shown in FIGS. 3–5, the drive system can be used to drive a turntable 50 mounted to a moving platen 52 in a horizontal injection molding machine. As shown in FIG. 5, the turntable 50 is mounted for rotation relative to the platen 52 by a plurality of bearings 51 and is held in place by retainer 53, which can be any suitable retaining means known in the art.

In such machines, the turntable 50 has a plurality of mold cores or mold cavities 54 mounted to one face 56. The turntable 50 is then rotated about an axis B between a number of positions. For example, in a first position, a first one of the mold cores or cavities 54 may be aligned with a respective mold core or cavity 58 on a stationary platen 60 and thereafter, in a second position, a second one of the mold cores or cavities 54 may be aligned with said respective mold cavity or core 58. Still further, the turntable 50 may be rotated to yet another position where the molded parts are ejected.

As before, a frameless, brushless electric motor 38 may be directly coupled to the turntable 50 to cause the turntable to rotate about an axis B. As shown in FIG. 5, the motor 38 has a stator 40 mounted to the moving platen 52 and a rotor 42 mounted to the turntable 50, which rotor rotates about an axis concentric to the axis B. The stator 40 and rotor 42 may be mounted to the platen 52 and the turntable 50, respectively using any suitable means known in the art. Support/wear plates 55 may be provided between the moving platen 52 and the turntable 50. The plates 55 may be formed from any suitable material known in the art.

The drive system of the present invention may also be used to drive a turntable 102 in a vertical molding machine 100. The machine 100 includes a plurality of molds 112 mounted on the turntable 102, which molds are rotated between stations so as to de-synchronize the injection molding procedure and reduce idle time of various elements of the system. An injection molding station 116 is positioned relative to the turntable 102 as well as an ejecting station 118.

In this type of machine, the molds 112 are filled at the injection molding station 116, and the turntable 102 is rotated while the molds 112 are cooled and indexed on the turntable 102 to ejection station 118 where each mold is opened, the molded article is removed, and the mold is closed and indexed to the injection molding station 116 to be filled again.

The turntable 102 is preferably rotatably mounted to a central tie bar or strain rod 120 which may be suitably mounted to a frame 122.

Molds 112 typically have a mold parting line 124 dividing mold 112 into a stationary mold element 126 which may be conventionally mounted to the turntable 102, and a movable mold element 128 which can be displaced, for example at ejecting station 118, so as to remove molded articles from the mold 112.

Injection molding station 116 preferably includes a primary clamp unit 130 which serves to clamp mold elements 126, 128 of molds 112 in injection molding station 116 and thereby seal the mold elements along mold parting line 124 during injection.

Injection molding station 116 also includes an injection molding unit 132 which may be of a conventional type. Injection molding unit 132 serves, in a well known manner, to inject molten material such as plastic resin into molds 112. Injection molding unit 132 is preferably mounted on a carriage 134 as shown. Carriage 134 allows injection molding unit 132 to be vertically and laterally positioned, relative to turntable 102, to accommodate molds 112 having differing sizes and configurations.

A mold opening and closing unit 136 is preferably disposed over the turntable 102, preferably over ejecting station 118. Mold opening and closing unit 136 serves to open molds 112 when they have cooled sufficiently so that the molded articles can be removed. Mold opening and closing unit 136 is preferably mounted to tie bar 120.

Figure 7:
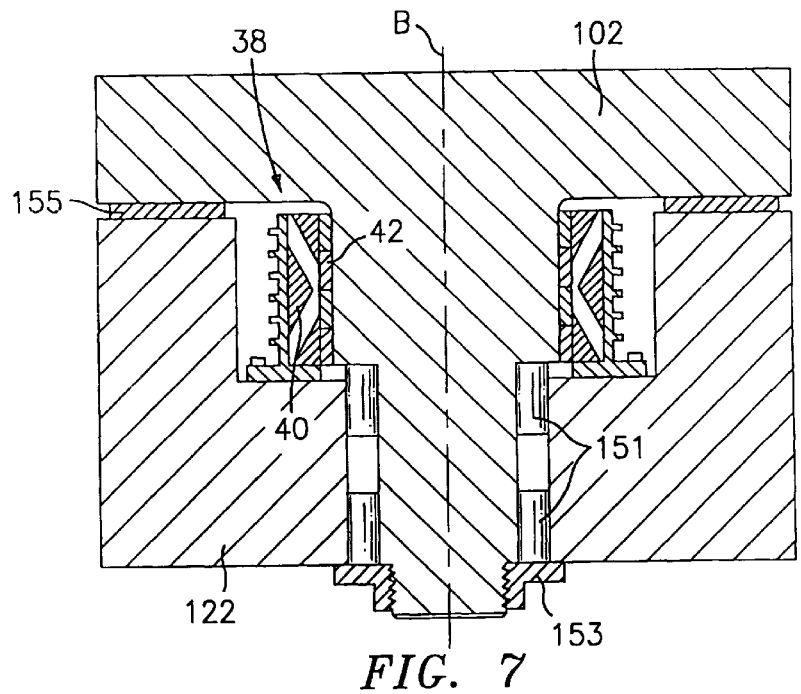
FIG. 7 is a sectional view showing the drive system of the present invention coupled to the turntable in the machine of FIG. 6.

Previously, the turntable 102 was rotated through a belt drive so as to serially index molds 112 from station to station. In accordance with the present invention, however, the turntable 102 is rotated to move the molds 112 from station to station by a frameless, brushless electric motor 38 having a stator 40 connected to the base 122 and a rotor 42 connected to the turntable 102. See FIG. 7. Any suitable connecting means (not shown) known in the art may be used to mount the stator 40 to the base 122 and the rotor 42 to the turntable 102. As before, the turntable 132 is mounted in bearings 151 for rotation about the axis B. A retainer 153 is provided for securing the turntable 102 to the base 122. The retainer 153 may comprise any suitable retention means known in the art. Support/wear plates 155 may be provided between the base 122 and the turntable 102.

Figure 9:
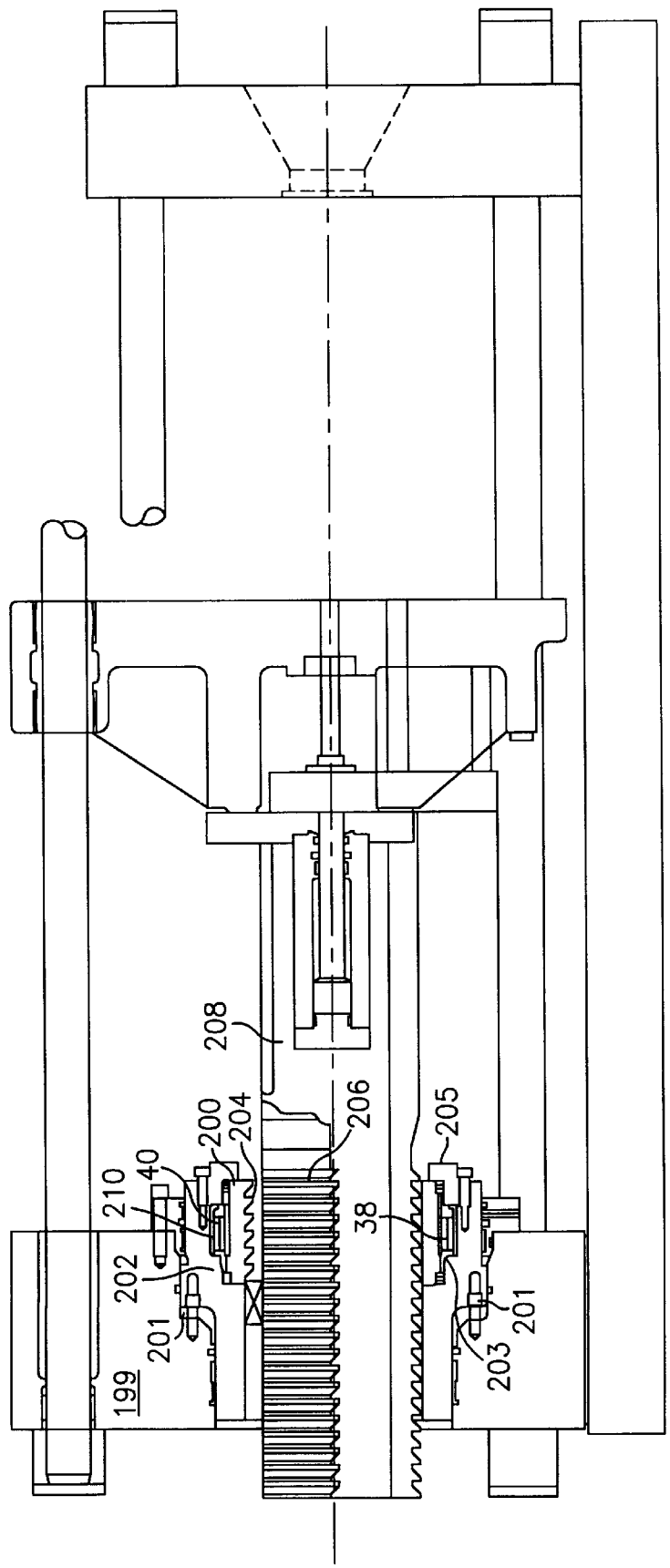
FIG. 9 is a sectional view of a rotary shutter element inside a clamping piston driven by the drive system of the present invention.

The drive system of the present invention may be used to operate rotary shutter elements in mold clamping systems such as that shown in co-pending U.S. patent applications 08/997,314, filed Dec. 23, 1997, entitled HIGH SPEED LOCKING CLAMP, to Robert D. Schad, and Ser. No. 09/048,610, filed Mar. 26, 1998, entitled HIGH SPEED LOCKING CLAMP, to Robert D. Schad, which are incorporated by reference herein. In these systems, a plurality of columns are used to move a movable platen between a mold open and a mold closed position and vice versa. When the movable platen is in the mold closed position, a clamping force is applied to hold it in the closed position. The clamping force is generated by a clamping piston and is transmitted to the platen via the columns. FIG. 9 illustrates a portion of this clamping system.

As shown in FIG. 9, the column 208 passes through the clamping piston 202 and has a plurality of external teeth 206. The teeth 206 are intended to cooperate with a set of teeth 204 on a rotary shutter element 200 housed inside the clamping piston 202. The rotary shutter element 200 may be positioned within the clamping piston 202 using any suitable means known in the art such as by placing it in a compartment 203 and securing it into position with a face plate 205. In operation, the shutter element 200 rotates between a first position where teeth 204 engage teeth 206 so as to transmit a clamping force generated by the clamping piston 202 to the column 208 and a second position where the teeth 204 are disengaged from the teeth 206 and the column 208 is free to move relative to the clamping piston 202. Typically, the shutter element 200 is rotated by 45 degrees. To prevent rotation of the clamping piston 202 as the shutter element rotates, dowel pins 201 are provided to connect the piston 202 to the block 199. As it moves back and forth, the piston 202 slides on the dowel pins 201.

In accordance with the present invention, a frameless electric motor 210 of the type described hereinbefore is installed within the clamping piston 202 to rotate the shutter element 200. The electric motor 210 has a stator 40 connected to the piston 202 and a rotor 38 connected to the exterior of the shutter element 200. The motor 210 is used to rotate the shutter element 200 between said first and second positions.

Figure 10:
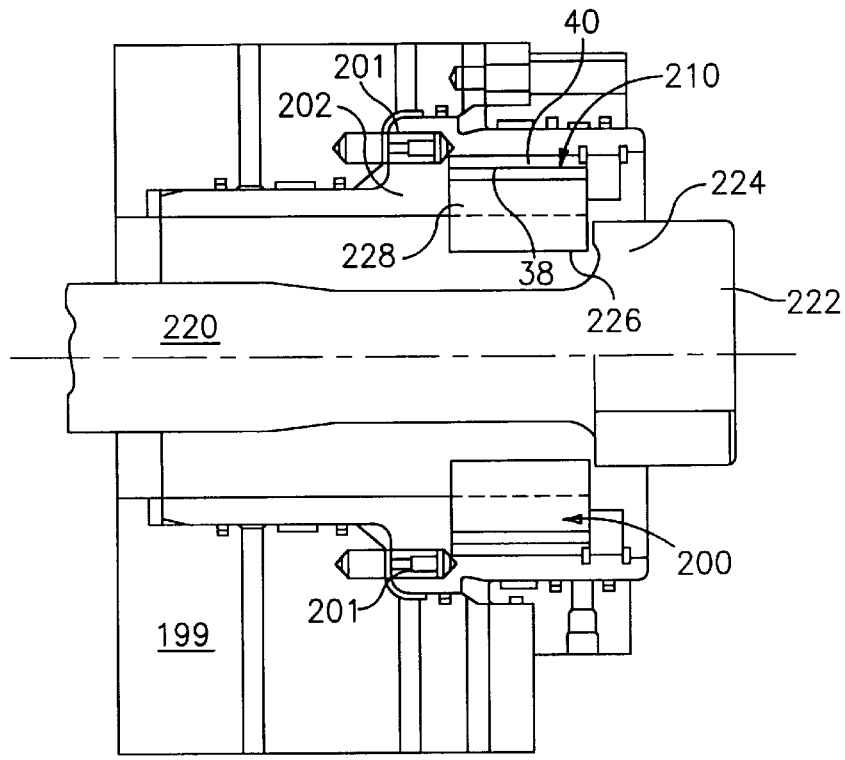
FIG. 10 is a sectional view of a rotary shutter element and piston combination.
Figure 11:
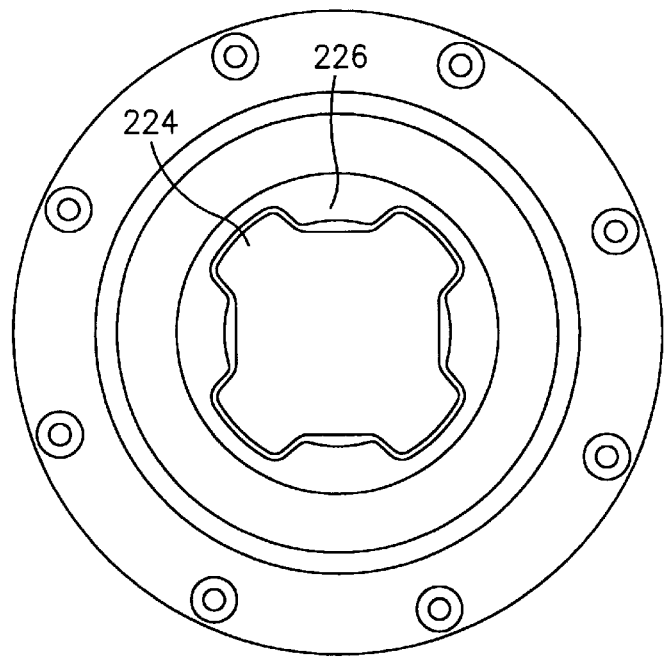
FIG. 11 is an end view of the rotary shutter element and piston combination of FIG. 10.

Another style of mold clamping system is illustrated in U.S. Pat. Nos. 5,624,695; 5,645,875; and 5,753,153, all of which are incorporated by reference herein. The clamping system includes securing/clamping assemblies for engaging a plurality of tiebars and applying a clamping force to a mold including two platens via the tiebars. A portion of this type of clamping system is illustrated in FIGS. 10 and 11. As shown therein, the securing/clamping assembly includes a clamping piston 202 and a rotary shutter element 200 housed within the clamping piston 202. The rotary shutter element 200 may be positioned within the clamping piston 202 using any suitable means known in the art. As before, dowel pins 201 are provided to counter rotational forces from the shutter element 200 and prevent the piston 202 from rotating. In this system, the rotary shutter element 200 engages the end 222 of a tiebar 220 to allow the clamp piston 202 to effect clamping. The tiebar end 222 has one or more extensions 224. The rotary shutter element 200 is formed by an insert 228 having a one or more protrusions 226 for engaging the extensions 224.

In accordance with the present invention, a frameless electric motor 210 of the type described hereinbefore is used to rotate the shutter element 200, typically by about 45 degrees. The frameless electric motor 210 in installed within the clamping piston 202 and includes a stator 40 connected to the piston 202 and a rotor 38 connected to the insert 228. The motor 210 rotates the shutter element 200 between a first position where the extensions 224 are engaged by the protrusions 226 and a second position where the extensions 224 are not aligned with or engaged by the protrusions 226.

To effect clamping, the shutter element 200 is rotated to the first position. The clamp piston 202 is then hydraulically actuated to urge tiebar end 222 to the right, thereby transmitting a clamping force to the mold (not shown). When the shutter element 200 is rotated to the second position by the motor 210, the protrusions 220 disengage from the extensions 224, as shown in FIG. 11, allowing the tiebar 220 to be moved through the piston 202.

The rotary shutter element and clamping piston combination shown in FIGS. 10 and 11 could be used in molding machines of the type shown in U.S. Pat. Nos. 5,728,409 and 5,750,162, both of which are incorporated by reference herein.

In the applications shown in FIGS. 9–11, the frameless electric motor drive of the present invention provides a space saving means of providing rotary motion. The earlier bulky linkage mechanism driven by hydraulic cylinders is eliminated. The frameless electric motor drive provides a faster rotary action then the cylinders in the case of small diameter clamping pistons. Another advantage is that by rotating the shutter element within the clamp piston, the piston itself does not need to rotate to engage the teeth, as in earlier versions. Thus, expensive rotary hydraulic seals previously needed for the clamp piston can be replaced with conventional sliding seals resulting in additional cost savings and increased reliability.

While the drive system of the present invention has been described in the context of an injection molding machine, it should be recognized that the same drive system could be used on other types of molding machines.

It is apparent that there has been provided in accordance with the present invention a frameless electric drive system for a molding machine which fully satisfies the means, objects, and advantages set forth hereinbefore. While the invention has been described in combination with specific embodiments thereof, it is evident that many alternatives, modifications, and variations will be apparent to those skilled in the art. Accordingly, it is intended to embrace all such alternatives, modifications and variations which fall within the spirit and broad scope of the appended claims.

What is claimed is:

1. A molding machine comprising:
   a rotatable member having an axis about which said member rotates;
   drive means directly coupled to said rotatable member for rotating said rotatable member, said drive means comprising an electric motor having a stator and a rotor whose axis of rotation is coincident with the axis of rotation of said rotatable member;
   means for applying a clamping force to a mold including a clamping piston having a passageway;
   said clamping force applying means further including a column axially movable through said passageway in said piston;
   said column including a first set of teeth on an exterior surface;
   said rotatable member comprising a rotatable shutter element mounted within said clamping piston, said rotatable shutter element having a second set of teeth for engaging said first set of teeth on said column; and
   said drive means being positioned within said clamping piston and operating to rotate said shutter element between a first position where said second set of teeth is engaged with said first set of teeth so that the clamping piston can transmit a clamping force to said column and a second position where said second set of teeth is disengaged from said second set of teeth and said column is free to move axially with respect to said piston.

2. A molding machine according to claim 1, wherein said electric motor comprises a brushless, frameless electric motor.

3. A molding machine according to claim 1, wherein said stator is mounted to said clamping piston and said rotor is mounted to said rotary shutter element.

4. A molding machine comprising:
   a rotatable member having an axis about which said member rotates;
   drive means directly coupled to said rotatable member for rotating said rotatable member, said drive means comprising an electric motor having a stator and a rotor whose axis of rotation is coincident with the axis of rotation of said rotatable member;
   means for applying a clamping force to a mold including a clamping piston having a passageway;
   said clamping force applying means further including a columnar member axially movable through said passageway;
   said columnar member having at least one extension adjacent an end thereof;
   said rotatable member comprising a rotatable shutter element within said clamping piston, said shutter element having at least one protrusion for engaging said at least one extension; and
   said electric motor being positioned within said clamping piston and being operated to cause said shutter element to rotate between a first position where said at least one protrusion engages said at least one extension to allow said clamping force to be transmitted from said clamping piston to said columnar member and a second position where said at least one protrusion is disengaged from said at least one extension so that said columnar member may move axially with respect to said clamping piston.

5. A molding machine according to claim 4, wherein said columnar member comprises a tiebar.

6. A molding machine according to claim 4, wherein said stator is mounted to said clamping piston and said rotor is mounted to said shutter element.

7. A molding machine according to claim 4, wherein said electric motor comprises a brushless, frameless electric motor.

* * * * *